Figure 1:
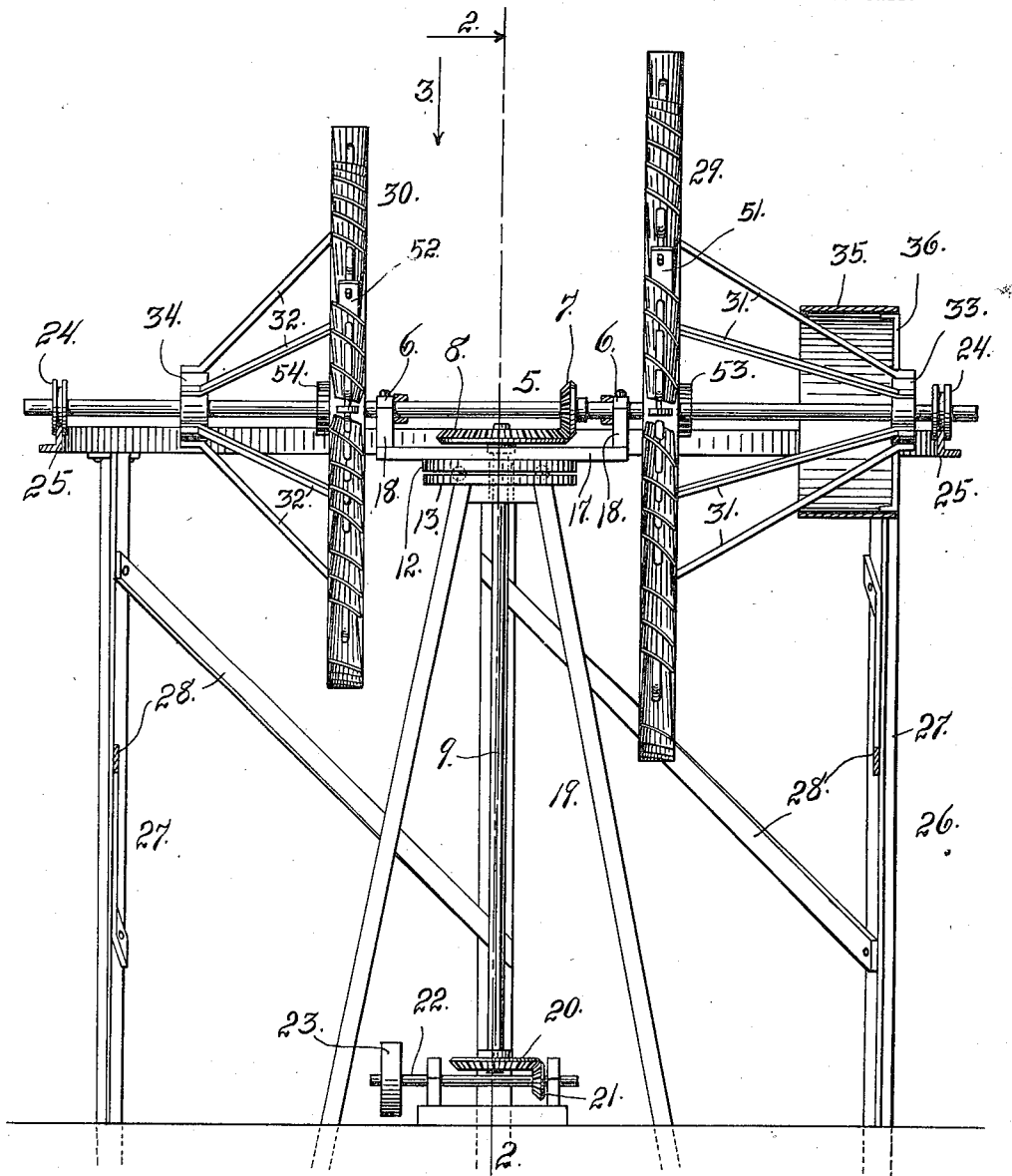

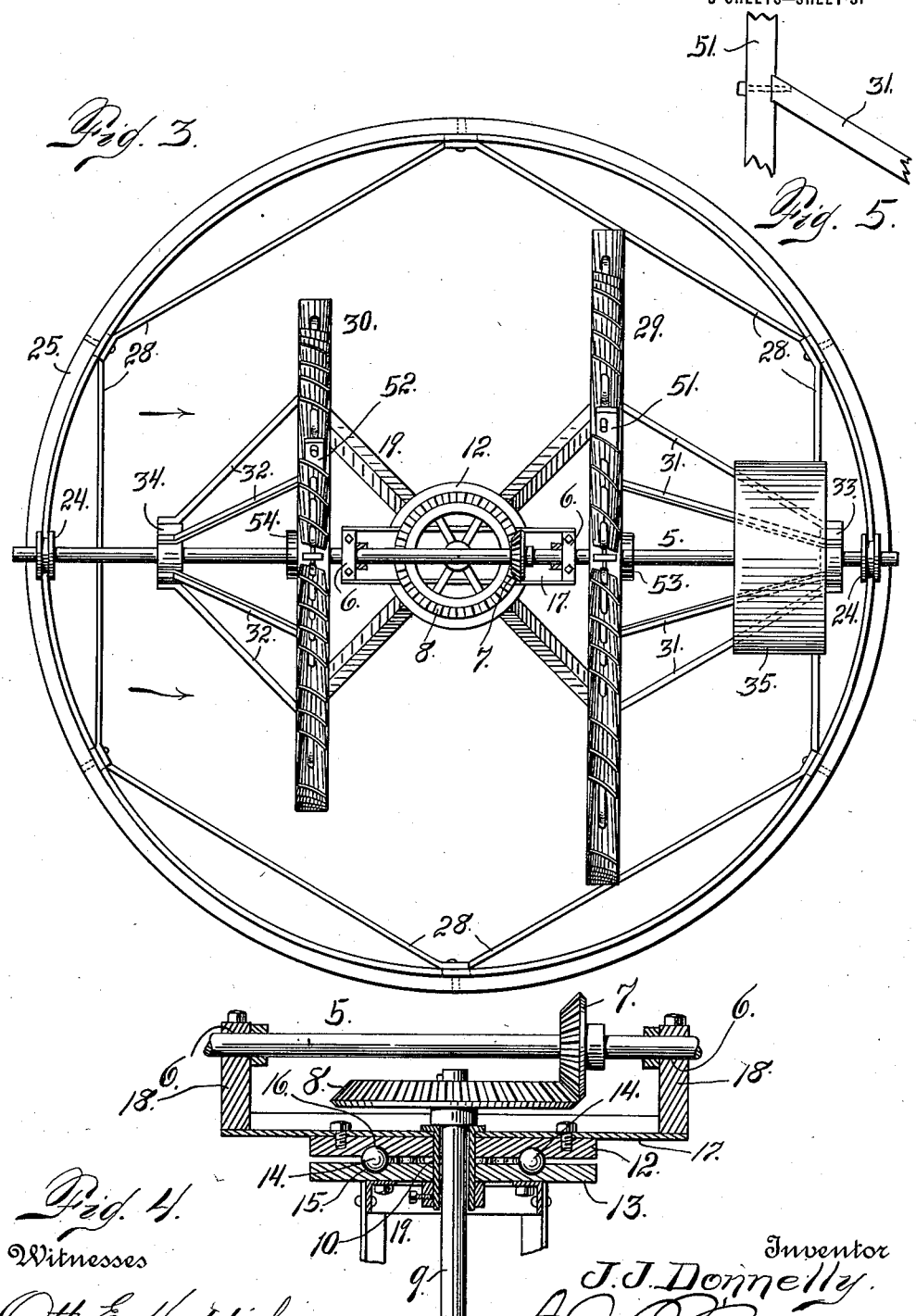

UNITED STATES PATENT OFFICE.

JOHN J. DONNELLY, OF DENVER, COLORADO.

WINDMILL.

1,142,502.  Specification of Letters Patent.  Patented June 8, 1915.

Application filed November 5, 1913. Serial No. 799,254.

*To all whom it may concern:*

Be it known that I, JOHN J. DONNELLY, a citizen of the United States, residing in the city and county of Denver and State of Colorado, have invented certain new and useful Improvements in Windmills; and I do declare the following to be a full, clear, and exact description of the invention, such as will enable others skilled in the art to which it appertains to make and use the same, reference being had to the accompanying drawings, and to the characters of reference marked thereon, which form a part of this specification.
My invention relates to improvements in wind mills, my object being to obtain great power in a construction of this class without the disadvantages heretofore incident to the attainment of such object, speaking with special reference to the state of the art so far as I have been able to ascertain. Heretofore, the size and weight of the wheel has been comparatively limited owing to the fact that no practicable construction had been devised for balancing the apparatus and preventing undue wear and tear after the wheel had reached a predetermined size, and that within comparatively narrow limits.
In my improved construction, I mount a turn-table including a circular track which surrounds the wind wheel or wheels, and the shaft upon which the wheel or wheels are mounted is equipped at its outer extremities with wheels which engage the circular track, thus supporting the shaft and the wheel or wheels thereon in a comparatively stable manner, regardless of their size or weight within any reasonable limits.
In order to still further balance the construction and increase its efficiency, I employ a second wheel arranged on the opposite side of the vertical axis of the turn table, the two wheels being preferably of different diameters, whereby they will coöperate, since the larger wheel by virtue of the action of the wind thereon will determine the position of both wheels with reference to the wind, or serve to maintain both wheels in the face of the wind or in the proper position with reference to its direction, for properly utilizing its force. By the employment of two wheels of different size, a vane may be dispensed with. I prefer however, to employ a vane of peculiar construction, namely, consisting of a hollow drum open at both ends and concentrically arranged upon the shaft and connected to rotate with the latter. This drum form is used because it is efficient while revolving and the construction requires that the vane be attached to the revolving shaft, whereby it must itself revolve.

Another feature of my improved construction, consists in the special arrangement of the blades of the wheels, whereby the blades are unequally projected from the axis of the wheel or so arranged that one set of the blades projects farther inwardly than the other, the latter projecting farther outwardly than the first mentioned set, whereby a portion of each blade is acted upon by an atmospheric zone which has been untouched, or not utilized by its companion or adjacent blade. It is found in actual practice that a greater efficiency can be obtained by virtue of this offset or staggered arrangement of the blades, since a greater area is utilized, and the air current is more active, not being constantly impeded. Thus a correspondingly increased efficiency is obtained.

Having briefly outlined my improved construction, I will proceed to describe the same in detail, reference being made to the accompanying drawing, in which is illustrated an embodiment thereof.

Figure 2:
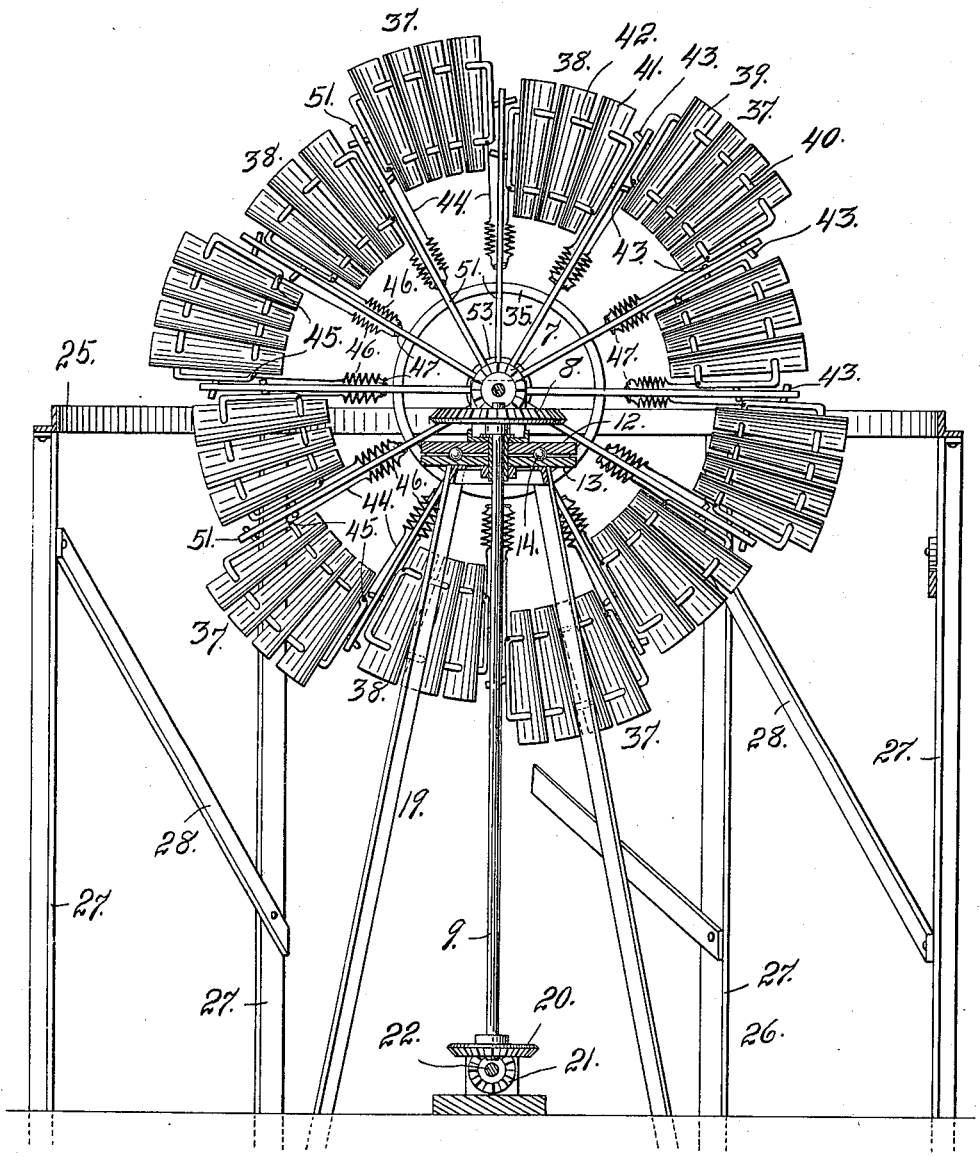

In this drawing: Figure 1 is a side elevation of my improved wind mill construction, the vane and part of the framework being sectioned. Fig. 2 is a section taken through the construction on the line 2—2, Fig. 1. Fig. 3 is a top plan view, looking in the direction of the arrow 3, Fig. 1. Fig. 4 is a fragmentary view of the operating shaft, illustrating its gearing connection with the vertical shaft for transmitting motion. Fig. 5 is a fragmentary view illustrating the manner of connecting the braces with the spokes of the wind wheels.
The same reference characters indicate the same parts in all the views.

Let the numeral 5 designate a horizontal shaft which is journaled in bearings 6 arranged on opposite sides of its center, said shaft carrying a pinion 7 fast thereon and meshing with a gear 8 which is secured to the upper extremity of a vertically disposed shaft 9 which passes through a sleeve 10, the latter in turn passing through registering openings formed in disks 12 and 13, which are equipped with coöperating raceways 14 and 15 in which are located bearing balls 16. The disk 12 which is uppermost, is secured to a bearing 17 the latter being provided with upwardly projecting relatively heavy lugs 18, whose upper extremities are recessed to receive the shaft 5, thus constituting a portion of the shaft bearings 6. The lower disk 13 is secured to the upper extremity of the framework of the tower 19.

The lower extremity of the shaft 9 is equipped with a gear 20, meshing with a smaller gear 21 fast on a shaft 22 from which the power may be taken through the medium of a pulley 23, and transmitted for doing work of any character.

The outer extremities of the shaft 5 are equipped with grooved wheels 24 which engage the upper edge of a circular track 25, the latter being supported upon a frame 26 which as illustrated in the drawing, is composed of vertical posts 27 connected and supported in coöperative relation by braces 28. As illustrated in the drawing, the circular track 25 is angular in cross section, and the wheels 24 engage the vertical flange of the angular structure. These wheels are loose on the shaft and they are maintained in their proper position by their engagement with the track. By virtue of this construction, if the track is slightly inaccurate, or deviates from a circle, the construction will still be operative without any undue wear of the parts.

Secured to the shaft 5 on each side of the center of the track and consequently on each side of the shaft 9, are two wind wheels 29 and 30, the wheel 29 being the larger. These wheels are provided with spokes 51 and 52, the inner extremities of each set of spokes being connected with the wheel hubs 53 and 54, while their outer extremities are connected with the blades as hereinafter explained. These wheels are further provided with inclined braces 31 and 32, the inner extremities of the braces being connected with the spokes 51 and 52 respectively, while their outer extremities are secured to hubs 33 and 34 respectively, said hubs being made fast to the shaft 5. Mounted on the hub 33 which is connected with the wheel 29, is a hollow drum 35 which is open at both ends, and constitutes the vane of the mill. This drum is connected with the hub by means of spokes 36. This vane is located near one of the track wheels 24, but within the space inclosed by the circular track 25.

Each wheel is further composed of a series of blade members 37, and 38, the members 37 extending farther outwardly, and the members 38 farther inwardly, whereby the blades 37 travel in an atmospheric zone farther from the center of the wheel than the blades 38, while the latter project into an atmospheric zone extending farther toward the center of the wheel than the blades 37.

The blades 37 are composed of a number of members 39 rigidly connected by a frame 40, while the blades 38 are each composed of a number of members 41 rigidly connected by a frame 42. Each frame of both sets of frames, is pivoted at the outer extremities of the spokes 51 and 52 as the case may be, whereby the blades are adapted to turn on the spokes to prevent the wheel from rotating too rapidly under the influence of a strong wind. These pivotal points are so located that the greater area of the blades normally extends outwardly beyond the pivots, whereby under the influence of an air current, that otherwise would impart too great speed to the mill, the blades will turn on their pivots and approach or assume a position in which the extremities of the blade members are pointed toward the wind, thus reducing the speed of the wheel to the desired extent. In order to maintain the blades normally in their proper position to take advantage of the wind which during the greater portion of the time, it will be understood, is not too strong, wires or small rods 44 are connected with the frames 42 near their inner extremities as shown at 45, while the opposite ends of the said wires or small rods are connected with spiral springs 46, the latter being in turn connected as shown at 47 with the spokes 51 and 52 as the case may be, as shown at 47.

Under the influence of a strong wind, the action thereof upon the blades will tend to stretch or place the springs 46 under tension, and as soon as the strength of the wind decreases, the recoil of the springs will return the blades to their normal position.

As heretofore stated, an important object of my present construction is to make it practicable to employ relatively large wheels in mills of this character. The reason is that the efficiency of these wheels increases very rapidly as the wheels increase in size or diameter. For instance, assuming that the diameter of a wheel is eight and one-half feet, under the influence of a velocity of wind sixteen miles per hour, the horse power of the wheel will be represented by 0.04; for a wheel ten feet in diameter operating under the influence of the same wind, the horse power is 0.12; for a wheel 12 feet in diameter with the same wind, the horse power is 0.21; for a 14 foot wheel, the horse power is 0.28; for a 16 foot wheel, the horse power is 0.41; for an 18 foot wheel, the horse power is 0.61; for a 20 foot wheel, the horse power is 0.78; and for a 25 foot wheel, the horse power is 1.34. This table, which is taken from the *Encyclopædia Britannica*, denotes the remarkable increase in horse power as compared with the increase in the diameter or size of the wheels. For instance, comparing the ten foot wheel with the twenty foot wheel, we find that the latter which has but twice the diameter of the former, has an efficiency in horse power when operating, under the same wind six and one-half times as great; while comparing the eight and one-half foot with the twenty five foot wheel, we find that the latter, while having a diameter a little less than three times that of the former, has an efficiency thirty-three and one-half times as great. This demonstrates the remarkable advantage resulting from an increase in the size of wind wheels.

Where two wheels are employed, as illustrated in the drawing, a much better balancing result is obtained; and while where a vane is used, these two wheels may be of the same size, it is preferred to make them of unequal diameter, whereby the larger wheel coöperates with the vane in determining the proper position of the wheels with reference to the direction of the wind. In fact, where the two wheels are of different diameters, as illustrated in the drawing, the structure would be operative if the vane were dispensed with altogether.

Attention is further called to the fact that a remarkable advantage is obtained by placing the wheel or wheels upon the shaft within the circle of the track 25, since the force of the wind acting upon the portion of the wheel above the shaft and more particularly upon the upper portion of the upper half of the wheel than upon the lower portion of the lower half, and this unequal force applied to the top of the wheel, has a tendency to break or bend the shaft in a downward direction, where the entire support for the shaft is central, or that afforded by the ordinary tower. However, with my improved construction with the circular track surrounding the area in which the wind wheel or wheels rotate, the shaft being made long enough to span this track, and equipped with wheels which engage the track, the track being well supported in a frame preferably located directly underneath the track, the aforesaid difficulty is entirely overcome, and the size and weight of the wheel or wheels may be made as large as desired.

Having thus described my invention, what I claim is:

1. The combination with a shaft, of a centrally located turn-table forming a support for the shaft and in which the latter is journaled, the axis of the shaft being perpendicular to that of the turn-table, a circular track surrounding the turn-table, and annularly arranged with reference thereto, the shaft being of a length to span the track diametrically and being connected therewith at opposite points to travel thereon to permit the shaft to change direction freely, a wind wheel mounted on the shaft between its bearing points on the track, and a vane carried by the shaft and rotating therewith.

2. The combination with a shaft, of a centrally located turn-table forming a support for the shaft and in which the latter is journaled, the axis of the shaft being perpendicular to that of the turn-table, a circular track surrounding the turn-table, and annularly arranged with reference thereto, the shaft being of a length to span the track diametrically and being connected therewith at opposite points to travel thereon to permit the shaft to change direction freely, a wind wheel mounted on the shaft between its bearing points on the track, and a vane carried by the shaft and rotating therewith, said vane being drum-shaped open at both ends, and annularly arranged.

3. The combination with a shaft, of a centrally located turn table pivotally mounted upon a central support and forming a support for the shaft in which the latter is journaled, the axis of the shaft being perpendicular to that of the turn table, a circular track surrounding the support of the turn table and annularly arranged with reference thereto, the shaft being of such a length to span the track diametrically and being connected therewith at opposite points to travel thereon to permit the shaft and turn table to change position freely, a wind wheel mounted on the shaft and a vane carried by the shaft and rotating therewith.

In testimony whereof I affix my signature in presence of two witnesses.

JOHN J. DONNELLY.

Witnesses:
A. J. O'BRIEN,
A. EBERT O'BRIEN.